United States Patent
Cucheran et al.

[11] Patent Number: 5,871,130
[45] Date of Patent: Feb. 16, 1999

[54] VEHICLE ARTICLE CARRIER

[75] Inventors: John S. Cucheran, Lake Orion; John A. Bott, Grosse Pointe Farms, both of Mich.

[73] Assignee: JAC Products, Inc., Ann Arbor, Mich.

[21] Appl. No.: 921,228

[22] Filed: Aug. 27, 1997

Related U.S. Application Data

[63] Continuation of Ser. No. 686,746, Jul. 26, 1996, abandoned, which is a continuation of Ser. No. 481,200, Jun. 7, 1995, abandoned, which is a continuation of Ser. No. 357,973, Dec. 16, 1994, abandoned, which is a continuation of Ser. No. 121,313, Sep. 15, 1993, abandoned, which is a continuation-in-part of Ser. No. 990,552, Dec. 14, 1992, Pat. No. 5,385,284, which is a continuation of Ser. No. 905,307, Jun. 29, 1992, abandoned, which is a continuation of Ser. No. 592,606, Oct. 4, 1990, Pat. No. 5,158,425, which is a continuation of Ser. No. 407,635, Sep. 15, 1989, abandoned, which is a continuation of Ser. No. 213,899, Jun. 30, 1988, Pat. No. 4,877,168, which is a continuation of Ser. No. 3,134, Jan. 14, 1987, Pat. No. 4,754,905, which is a continuation of Ser. No. 778,385, Sep. 20, 1985, Pat. No. 4,684,048.

[51] Int. Cl.⁶ ....................................................... B60R 9/04
[52] U.S. Cl. ............................................. 224/321; 224/326
[58] Field of Search .................................... 224/309, 310, 224/314–317, 319–326; 410/104, 105, 113, 150

[56] References Cited

U.S. PATENT DOCUMENTS

| | | |
|---|---|---|
| Re. 26,539 | 3/1969 | Bott . |
| 3,542,264 | 11/1970 | Meyer et al. . |
| 3,554,416 | 1/1971 | Bott . |
| 4,099,658 | 7/1978 | Bott . |
| 4,133,465 | 1/1979 | Bott . |
| 4,162,755 | 7/1979 | Bott . |
| 4,170,322 | 10/1979 | Bott . |
| 4,182,471 | 1/1980 | Bott . |
| 4,269,340 | 5/1981 | Kowalski et al. . |
| 4,274,570 | 6/1981 | Bott . |
| 4,295,587 | 10/1981 | Bott . |
| 4,323,182 | 4/1982 | Bott . |
| 4,364,500 | 12/1982 | Bott . |
| 4,406,386 | 9/1983 | Rasor et al. . |
| 4,431,123 | 2/1984 | Bott . |
| 4,456,158 | 6/1984 | Wertz et al. . |
| 4,460,116 | 7/1984 | Bott . |
| 4,473,178 | 9/1984 | Bott . |
| 4,500,020 | 2/1985 | Rasor . |
| 4,516,710 | 5/1985 | Bott . |
| 4,684,048 | 8/1987 | Bott . |
| 4,754,905 | 7/1988 | Bott . |
| 4,877,168 | 10/1989 | Bott . |
| 4,883,208 | 11/1989 | Bott . |
| 4,911,348 | 3/1990 | Rasor et al. . |
| 4,988,026 | 1/1991 | Rasur et al. ............................ 224/321 |
| 5,007,570 | 4/1991 | Himmel ................................. 224/321 |
| 5,143,267 | 9/1992 | Cucheran et al. ...................... 224/321 |
| 5,203,483 | 4/1993 | Cucheran ............................... 224/321 |
| 5,232,139 | 8/1993 | Cucheran ............................... 224/324 |

FOREIGN PATENT DOCUMENTS

| | | |
|---|---|---|
| 29 25684 | 1/1981 | Germany . |
| 3034226 | 4/1982 | Germany ............................... 224/309 |
| 35 28569 A1 | 2/1987 | Germany . |

*Primary Examiner*—J. Casimer Jacyna
*Attorney, Agent, or Firm*—Harness, Dickey & Pierce, PLC

[57] ABSTRACT

A vehicle article carrier for securing cargo and other like items elevationally above the roof of a vehicle. The vehicle article carrier includes pair of support members fixed to the roof of the vehicle, a bracket member disposed on each of the support members and a cross bar extending between the bracket members. Each of the bracket members is slidably positionable along its associated support member. Each support member further includes a main channel having a depending lip portion which includes an aperture or notch formed therein. The aperture or notch is adapted to positively engage with a hook of the associated bracket member to even more positively secure the bracket member to the support member.

3 Claims, 5 Drawing Sheets

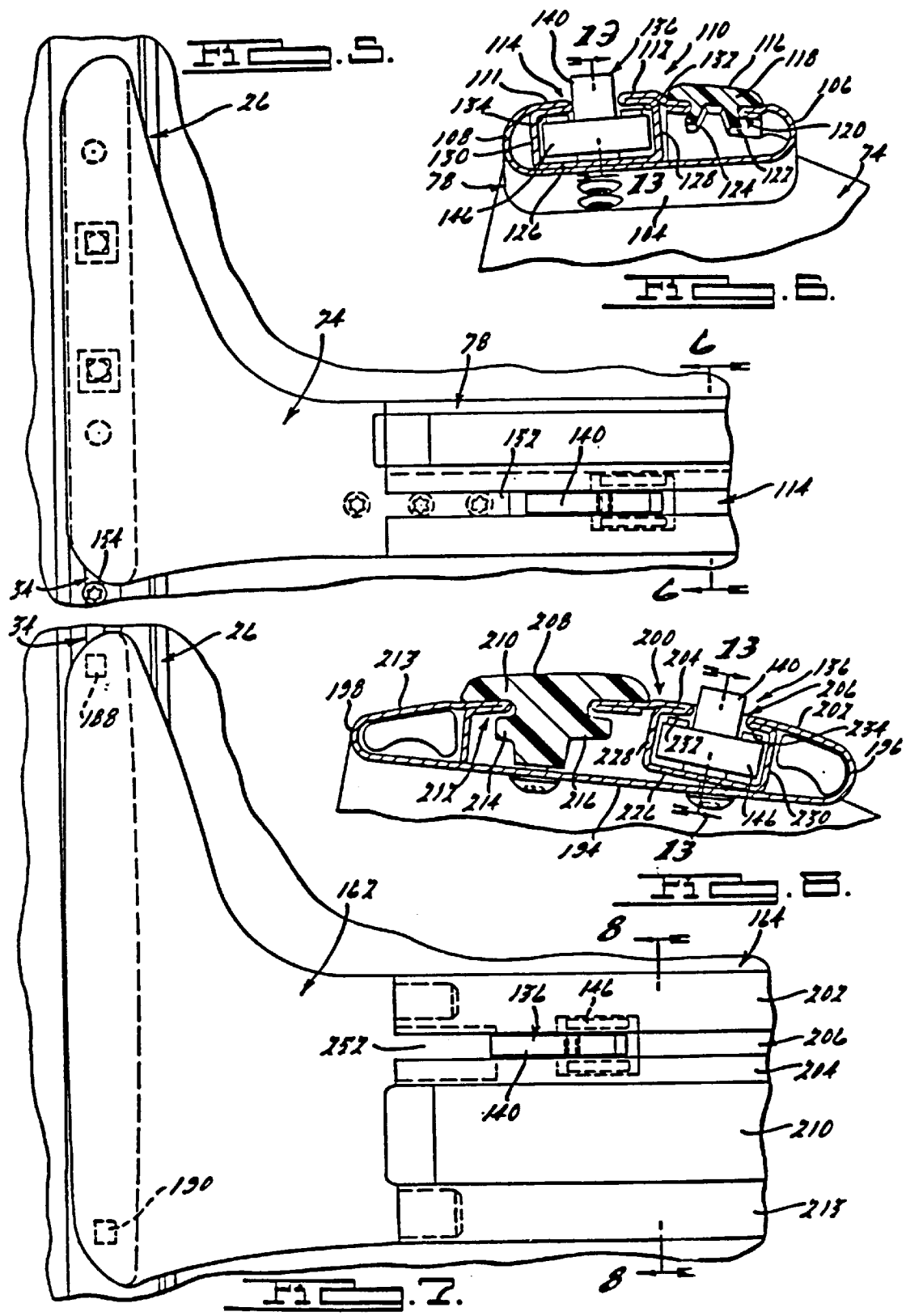

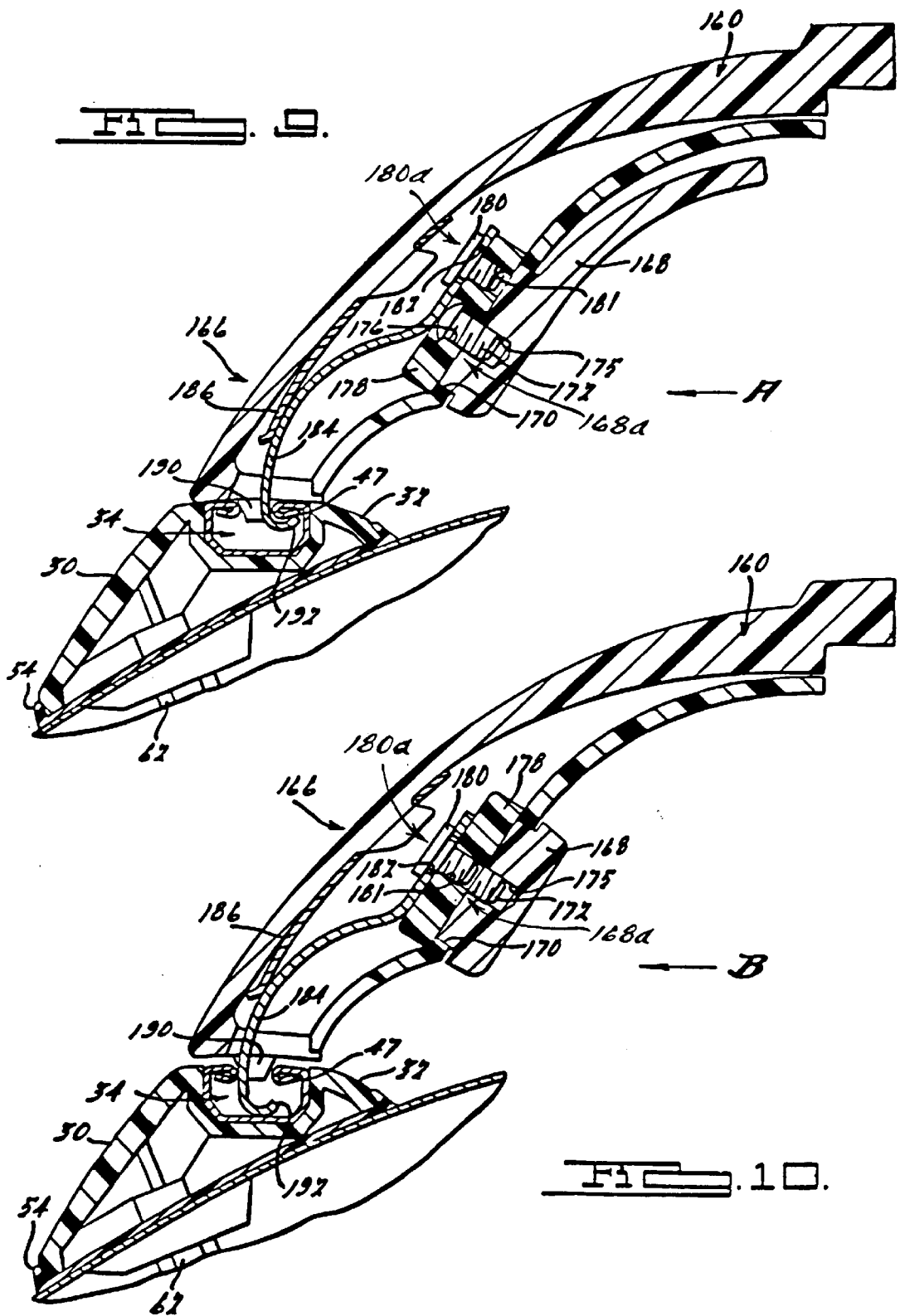

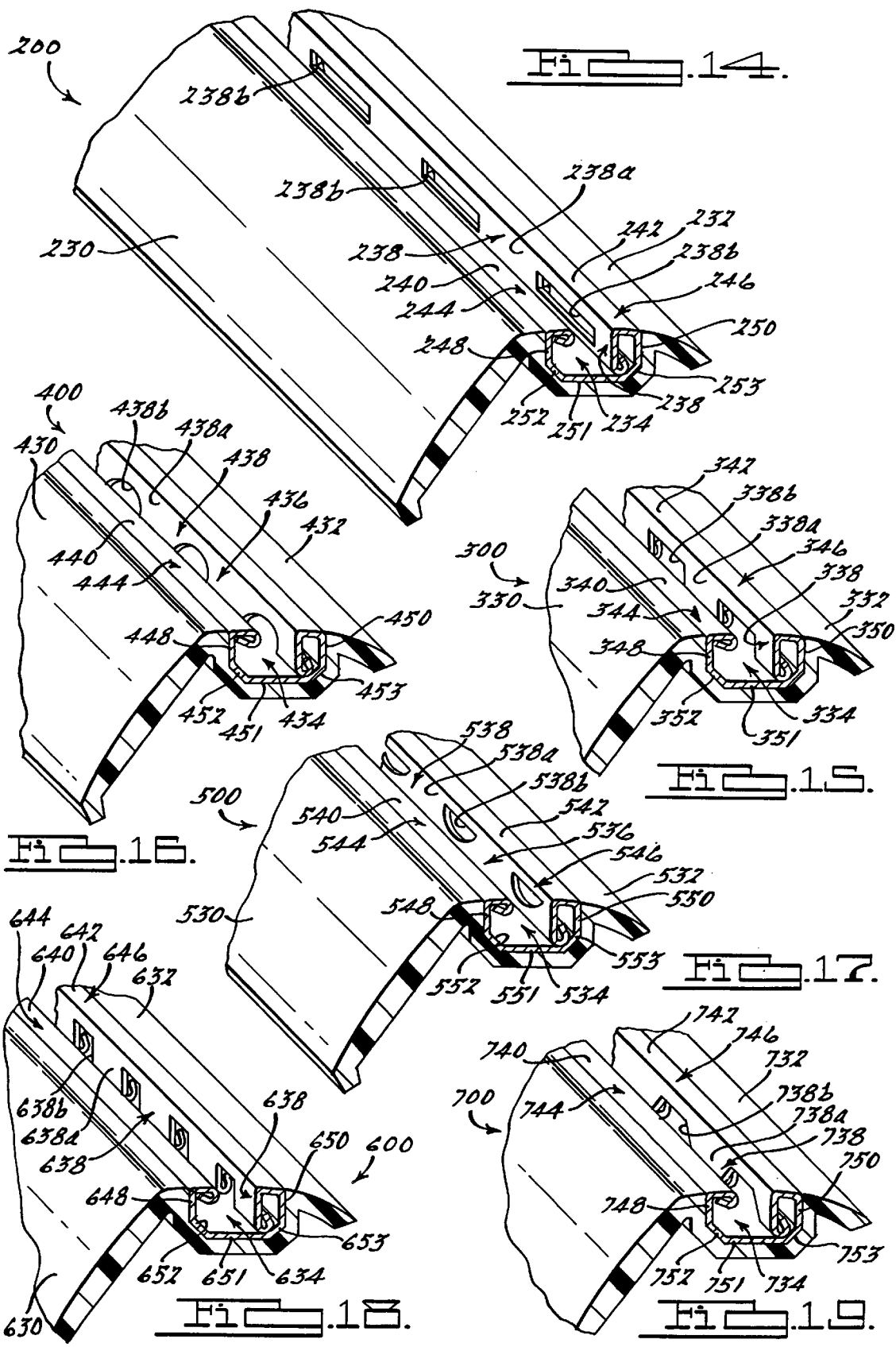

VEHICLE ARTICLE CARRIER

This application is a continuation of U.S. application Ser. No. 08/686,746, filed Jul. 26, 1996, now abandoned which is a continuation of U.S. application Ser. No. 08/481,200, filed Jun. 7, 1995, abandoned, which is a continuation of U.S. application Ser. No. 08/357,973, filed Dec. 16, 1994, abandoned, which is a continuation of U.S. application Ser. No. 08/121,313, filed Sep. 15, 1993, abandoned which is a continuation in part of U.S. application Ser. No. 07/990,552, filed Dec. 14, 1992, now U.S. Pat. No. 5,385,284, which is a continuation of U.S. application Ser. No. 07/905,307, filed Jun. 29, 1992, abandoned, which is a continuation of U.S. application Ser. No. 07/592,606, filed Oct. 4, 1990, now U.S. Pat. No. 5,158,425, which is a continuation of U.S. application Ser. No. 07/407,635, filed Sep. 15, 1989, abandoned, which is a continuation of U.S. application Ser. No. 07/213,899, filed Jun. 30, 1988, now U.S. Pat. No. 4,877,168, which is a continuation of U.S. application Ser. No. 07/003,134, filed Jan. 14, 1987, U.S. Pat. No. 4,754,905, which is a continuation of U.S. application Ser. No. 06/778,385, filed Sep. 20, 1985, now U.S. Pat. No. 4,684,048.

BACKGROUND AND SUMMARY OF THE INVENTION

The present invention relates generally to vehicle article or luggage carriers and more particularly to a new and improved vehicle luggage carrier of the type shown in Applicant's U.S. Pat. No. 4,099,658, issued Jul. 11, 1978. Generally, the article carrier of the present invention is of the type which comprises two or more slat-type elements which are fixedly secured to an exterior horizontal surface of an automotive vehicle, such as a vehicle roof or a trunk lid, and which are permanently attached to that surface and adapted to have ancillary article constraining members removably and/or adjustably secured thereto and includes a system of adjustable and fixed components which cooperate with one another and which may be removable in some instances.

The present invention has as one principal object to provide a luggage rack with slidably adjustable and fixedly engageable components including slidably adjustable cross members having tie downs for boxes, luggage, and the like associated with the cross members. The cross members and tie downs of the present invention are not only adjustable but also may be either removable from the luggage carrier or stored within other components of the luggage carrier substantially out of view. Each cross member may include at least one tie down and/or abutment member for optimum securement of articles or luggage to the article carrier and thereby the vehicle.

A significant advantage of the article carrier of the present invention is that the article carrier has a low profile when not in use with minimal structure projecting above the plane of the vehicle surface to which the article carrier is attached, thereby minimizing any adverse wind noise or fuel economy effects that would exist with any portion of the carrier being substantially vertically elevated.

The present invention further incorporates all of the aesthetically appealing features and the myriad of functional features and optional accessories disclosed in the slat-type luggage carriers of Applicant's prior patents, such as that described in U.S. Pat. No. 4,099,658, referenced above.

Even more notably, the present invention elevates the aerodynamic design of a vehicle article carrier system having adjustable and/or removable components to an improved design not previously attained by any prior art carriers. The elongated support member or slat of the present invention providing the foundation of the carrier has surfaces which not only flow into and integrate with the surface of the vehicle, but also includes a channel along which components may be adjusted and/or removably attached.

In cooperation with this improved support member or slat, a new and improved locking mechanism for attaching the adjustable and/or removable components of the system to the member or slat is included having an aerodynamic, hidden release element.

Additional advantages are provided in the combination of the above features with other fixed components of an article carrier system and an improved cross member construction integrating adjustable tie down and/or abutment elements disposable out of view, similar to those described in Applicant's U.S. Pat. No. 4,460,116, issued Jul. 17, 1984, and further integrating a pad construction in a cross rail spaced from a functional channel on load bearing cross members for a more stable yet cushioned load bearing support for articles disposed on the cross members.

Yet another feature of the present invention is provided in connection with the slats. The slats of the present invention incorporate a plurality of apertures and/or notches which are formed in an elongated channel which further help to even more positively secure the locking mechanism of the apparatus to the slat. The notches and/or apertures may take a variety of forms to suit the needs of specific applications and the specific structure of the locking mechanism used therewith.

Other objects and advantages of the present invention will become apparent from the following detailed description taken in conjunction with the following drawings.

BRIEF DESCRIPTION OF THE DRAWINGS

FIG. 5 is an elevated enlarged fragmentary view of one of the front stanchion assemblies of FIG. 1 taken in the direction of arrow 5;

FIG. 6 is a cross sectional view of the cross rail portion of FIG. 5 taken along the line 6—6 of FIG. 5;

FIG. 7 is an elevated enlarged fragmentary view of one of the rear stanchion portions of the structure of FIG. 1 taken in the direction of arrow 7;

FIG. 8 is a cross sectional view of the cross rail portion of FIG. 7 taken along the line 8—8 of FIG. 7;

FIG. 9 is a cross sectional view of the rear stanchion of FIG. 7 locked to the base support member or slat of FIG. 1;

FIG. 10 is a cross sectional view similar to FIG. 9 of the rear stanchion of FIG. 7 released from the base support member or slat of FIG. 1;

FIG. 14 is a fragmentary perspective view of a slat in accordance with a preferred embodiment of the present invention showing the channel member of the slat having a plurality of notches with which the hook of the present invention may engage;

FIG. 15 is an alternative preferred embodiment of the apparatus of FIG. 14 showing the channel member including a plurality of notches on an inner wall thereof;

FIG. 16 is another alternative preferred embodiment of the present invention of FIG. 14 showing the channel member comprising a plurality of semi-circular notches formed in an inner wall thereof;

FIG. 17 is yet another alternative preferred embodiment of the apparatus of FIG. 14 showing a plurality of notches in an inner wall of the channel member of the slat, where the notches each have a "half moon" shape;

FIG. 18 is still another alternative preferred embodiment of the slat assembly of FIG. 14 showing the channel member thereof including a plurality of square shaped notches formed in an inner wall of the channel member; and FIG. 19 is another alternative preferred embodiment of the apparatus of FIG. 14 showing a plurality of notches formed in a channel member thereof, where each of the notches have angled sides.

DETAILED DESCRIPTION OF THE PREFERRED EMBODIMENTS

Figure 1:
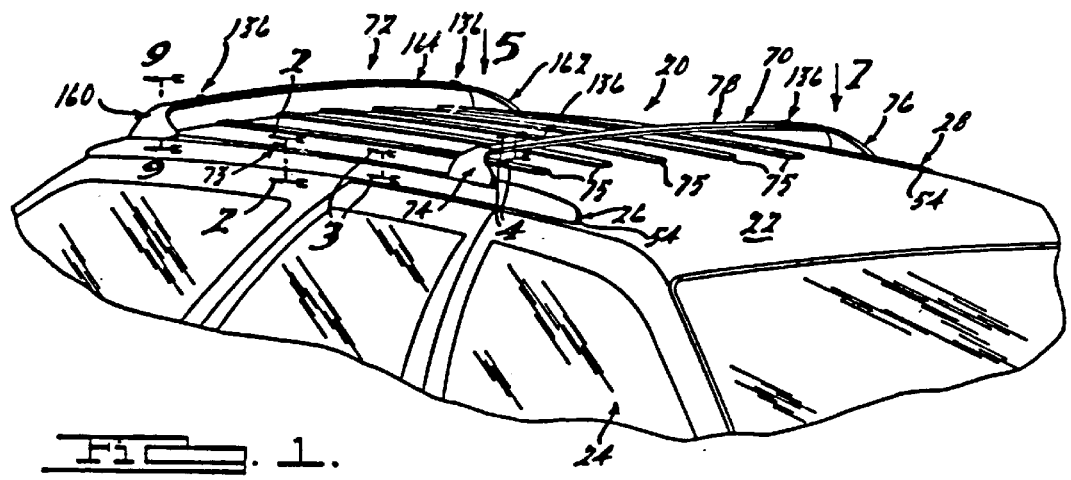
FIG. 1 is a fragmentary perspective view of an automobile showing an article carrier mounted thereon which is constructed in accordance with the principles of the present invention.

Referring now in detail to FIG. 1 of the drawings, a vehicle luggage carrier 20 is shown in operative association with a generally horizontally disposed roof 22 of a typical automotive vehicle 24. Generally speaking, the luggage carrier 20 comprises a pair of laterally spaced, longitudinally extending support members or slats 26 and 28 which are secured upon the roof 22 at positions adjacent the lateral sides or edges thereof. In the embodiment illustrated, the members 26 and 28 are disposed over the seam where the roof 22 meets the remainder of the body portion of the vehicle, where the roof 22 has a downward curvature, which places the members 26 and 28 adjacent the horizontally extending surface portion of the roof 22. The members 26 and 28 have an external surface configuration that flows aerodynamically and smoothly in the surface of the vehicle 24.

Figure 2:
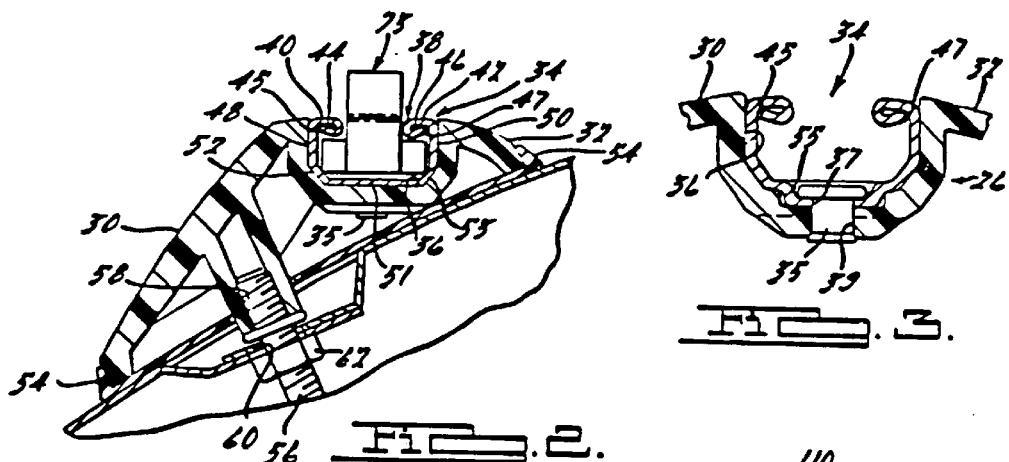
FIG. 2 is an enlarged sectional view of the support member portion of the structure illustrated in FIG. 1 taken along the line 2—2 thereof.
Figure 3:
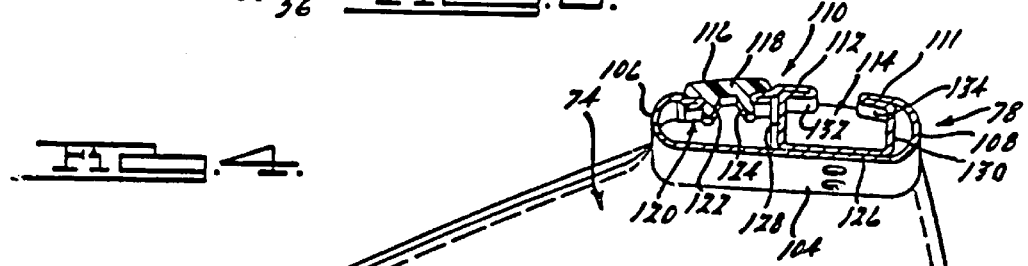
FIG. 3 is an enlarged sectional view of the support member portion of the structure illustrated in FIG. 1 taken along the line 3—3 thereof.

Intermediate portions of the member 26 (or 28) are illustrated in cross section in FIGS. 2 and 3. The member 26 comprises first 30 and second 32 exterior surfaces having an elongated channel 34 between the surfaces. The channel 34 comprises an elongated recess 36 and a liner 38 disposed in said recess 36 by means of, with reference to FIG. 3, fasteners 35 set through bores 37 in the liner and bores 39 in the recess 36. The liner 38 has upper article supporting surfaces 40, 42 disposed on a pair of inwardly directed upper flanges 44, 46, a pair of sidewalls 48, 50 extending downwardly therefrom, and a base 51 extending between the walls 48, 50 and integrated with the walls 48 and 50 via walls 52 and 53, respectively. The upper flanges 44, 46 are rolled back as illustrated in FIGS. 2 and 3 to provide grooves 45 and 47 in the interior of the channel 34 for the purposes as will be described below. The fasteners 35 are set below the surface of the base 51 by placement in recesses 55, as shown in FIGS. 3 and 4.

Referring to FIG. 2, a pad 54 is disposed between each of the members 26 and 28 and the roof 22. Each member 26 or 28 is secured to the roof 22 by a plurality of threaded collar studs 56 threadably engaged to the member 26 or 28 within a bore 58 and engaged with the roof 22 at the interior of the roof 22 through a plurality of holes 60 in the roof by means of a plurality of nuts 62. The studs 56 engage the members 26 and 28 at the plurality of bores 58 by augering into the members 26 and 28, which are plastic in the preferred embodiment, or by other conventional means. In this manner, the studs 56 are all hidden from view when the members 26 and 28 are assembled on the vehicle.

The article carrier 20 of FIG. 1 further comprises a pair of transversely or laterally extending cross member assemblies 70 and 72 and may also include a tie down 73 and a plurality of intermediate supporting slats 75. The front cross member assembly 70 comprises a pair of stanchions 74 and 76 telescopically engaged with and secured to a front cross rail 78. Referring to FIG. 4, the stanchion 74 (and likewise 76) is fixedly secured to the support member 26 (and 28) via two posts 80 and 82 which fit into two bores 84 and 86 at the front portion of each of the members 26 and 28 and via two bolts 88 and 90 fitting through recesses 92 and 94 and apertures 96 and 98 in each of the stanchions. 74 and 76 into corresponding threaded bores 100 and 102 in the members 26 and 28.

Figure 4:
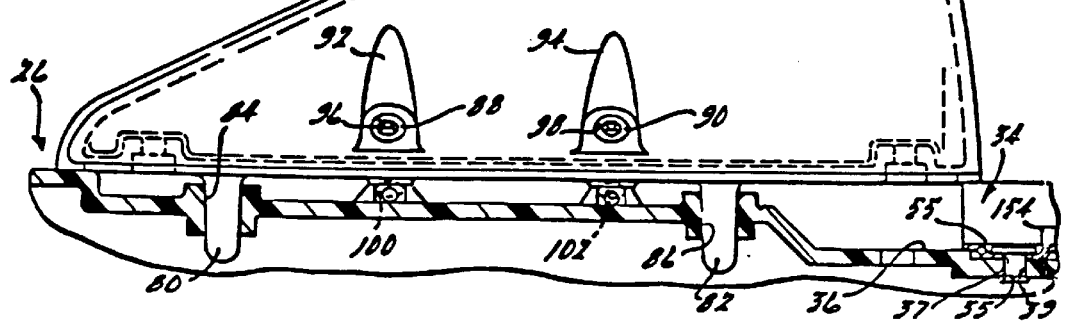
FIG. 4 is an enlarged sectional view of one of the front stanchion portions of the structure of FIG. 1 taken along the line 4—4 thereof.

The stanchions 74 and 76 have an aerodynamically streamlined curvature as illustrated in FIGS. 1, 4 and 5 and telescopically engage the front cross rail 78 in a similarly aerodynamically streamlined manner. Referring to FIGS. 4 and 6, the cross rail 78 comprises a bottom surface 104 from which a curved leading surface 106 and a curved trailing surface 108 extend upwardly. The upper surface 110 of the cross rail 78 comprises a series of elongated article supporting surfaces including surfaces 111 and 112 disposed one on each side of an elongated first channel 114 and a surface 116 disposed on an elongated front bumper 118 set into a second channel 120 in the rail 78. The bumper 118 has a pair of elongated flanges 122 and 124 on the underside thereof to secure the bumper in the second channel 120.

Figure 13:
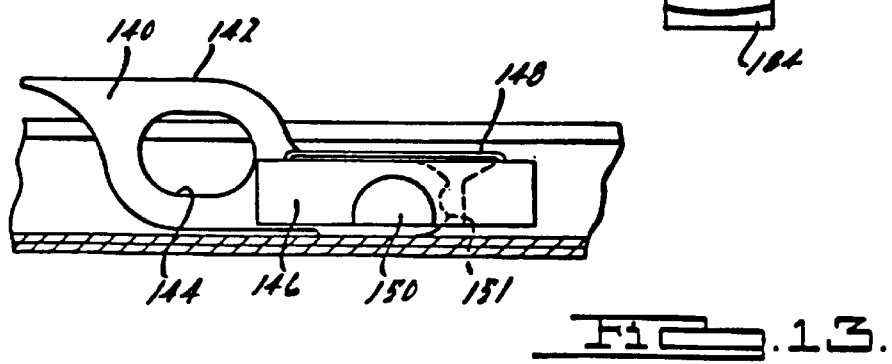
FIG. 13 is a vertical sectional view of either FIG. 6 or FIG. 8 along the line 13—13 of either view of the tie down disposed in the cross rail of either view.

Referring to FIGS. 4 and 6, the first channel 114 has an interior cross section having a base 126, a pair of sidewalls 128 and 130, and a pair of interior clamping surfaces 132 and 134. Within the first channel 114 (FIG. 6) is disposed a tie down/positioning member 136 similar to that disclosed in Applicant's U.S. Pat. No. 4,460,116, issued Jul. 17, 1984. The tie down/positioning member 136 (FIGS. 6 and 13) is comprised of an upper section 140 having a vertically disposable abutment surface 142 and an aperture 144 therein, a base portion 146 including spring biasing member 148, and a pivot 150 for pivotably associating the upper section 140 with the base portion 146. The upper section 140 also includes a lower cam member 151 on the opposite side of the pivot 150 which engages the base 126 of the first channel 114 with pivotal movement of the upper section 140 from the horizontal to the vertical and clamps the biasing members 148 against the clamping surfaces 132 and 134 and locks the tie down/positioning member 136 in any selected position along the length of the first channel 114. The ends of the channel 114 also include an abutment 152 (FIG. 5) to aid in disposing the upper section 140 from the horizontal to the vertical.

Figure 11:
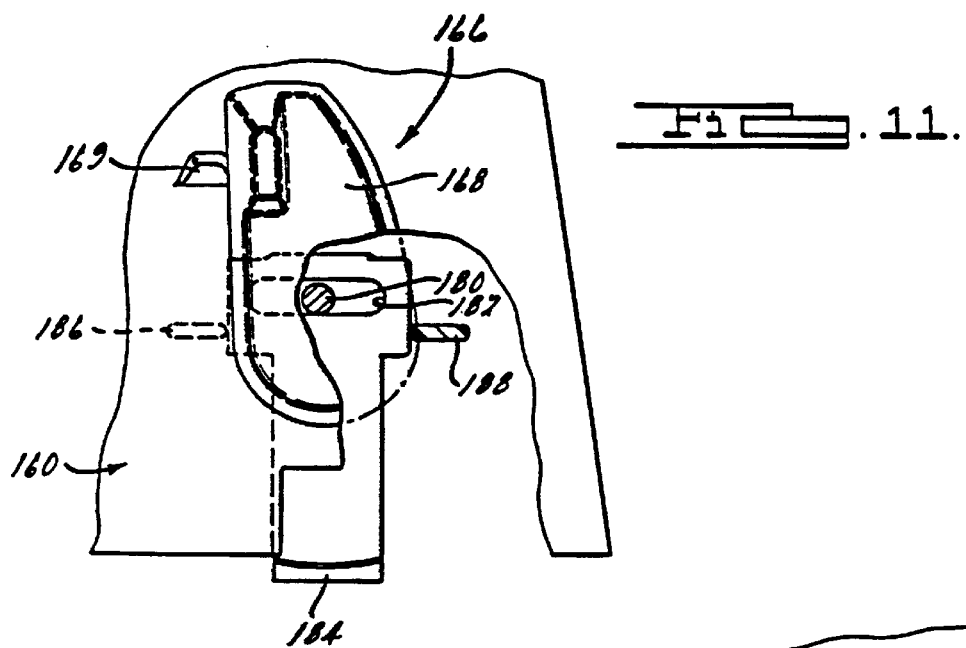
FIG. 11 is a view similar to FIG. 4 of the rear stanchion of FIG. 9 looking in the direction of arrow A in FIG. 9 having portions broken away.
Figure 12:
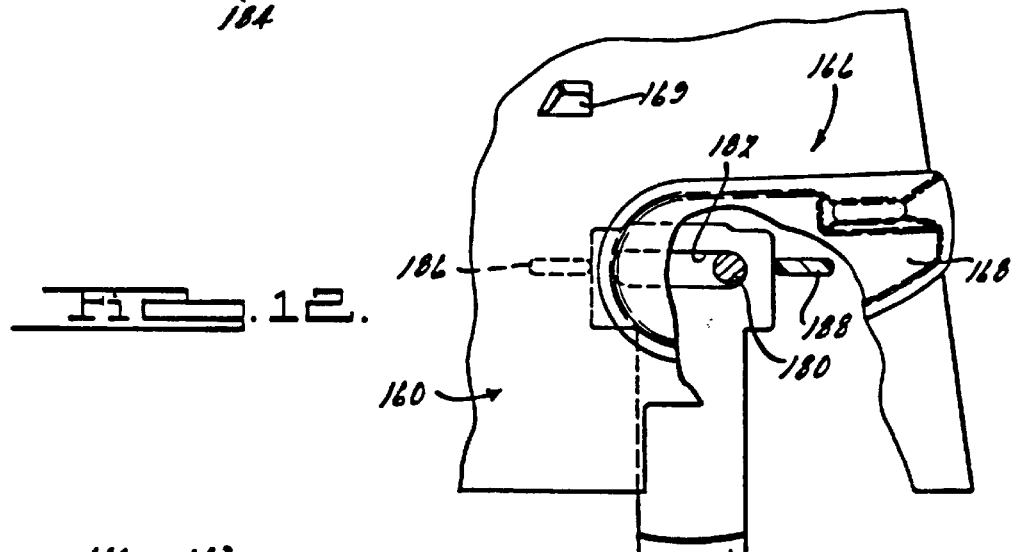
FIG. 12 is a view similar to FIG. 11 of the rear stanchion of FIG. 10 looking in the direction of arrow B in FIG. 10 having portions broken away.

The rear cross member assembly 72 is adjustable to any selected position along the length of the members 26 and 28, as determined by a stop 154 (FIGS. 4 and 5) or by the end of the channel 34, and may also be removed, if desired. The assembly 72 (FIGS. 1 and 7) comprises a pair of stanchions 160 and 162 telescopically engaged with and secured to a rear cross rail 164. The stanchions 160 and 162 each engage a corresponding support member 26 or 28 at the channel 34 thereof via a locking mechanism 166 (FIGS. 9 through 12). The locking mechanism 166 comprises a pivoted lever 168 mounted to each stanchion 160 or 162 within a recess 170 and secured to a pin 172. The lever 168 is limited in movement by a stop 169 (FIG. 11) to indicate a vertically disposed position for the lever 168. The pin 172 threadably engages the lever 168 in a bore 175 and communicates with the interior 174 of the stanchion and engages an eccentric member 178 disposed in the stanchion interior 174 via a bore 176 at a position offset from the center of the member 178 to eccentrically move a pin 180 mounted on the member 178 at bore 181. Referring to FIGS. 11 and 12, the pin 180 moves within a yoke 182 which is integrated with a hook 184. Guides 186 and 188 may be disposed one on each side of the yoke 182 to stabilize the linear vertical movement of the hook 184. The hook 184 is formed with a curvature to permit some resiliency. Further tension is applied to the hook 184 by a tensioning member 186 fixedly disposed adjacent the path of movement of the hook 184 as illustrated in FIGS. 9 and 10.

In operation, the stanchion 160 or 162 is placed over the channel 34 of the support member or slat 26 and the hook 184 is placed within the channel 34. The stanchion 160 or 162 also includes front and rear alignment posts 188 and 190 (FIG. 7) which are also placed within the channel 34 as the stanchion is set upon the upper surfaces 40 and 42 of the member 26 or 28. Once alignment is attained, the lever 168 is rotated from a horizontally disposed position (FIG. 10) to a vertically disposed position (FIG. 9) abutting against the stop 169 and lifting the hook 184 so that its leading edge 192 is engaged with the groove 47 of the channel 34 to clamp the stanchion 160 or 162 to the support member or slat 26. The return of the lever 168 to a horizontal disposition releases the hook 184 and the stanchion 160 or 162 from the member or slat 26 for adjustment or removal.

Referring to FIGS. 7 and 8, the rear cross rail 164 is similar to the front cross rail 78 in that it has a bottom surface 194 from which a curved leading surface 196 and a curved trailing surface 198 extend upwardly. It should be noted that the leading surface 196 and trailing surface 198 may be reversed, however, depending upon the selected placement of the rear cross rail assembly 72 on the members 26 and 28. The upper surface 200 of the cross rail 164 comprises a series of elongated article supporting surfaces including surfaces 202 and 204 disposed one on each side of an elongated first channel 206, a surface 208 disposed on an elongated front bumper 210 set into a second channel 212 in the rail 78 and an additional surface 213. The bumper 210 has a pair of elongated flanges 214 and 216 on the underside thereof to secure the bumper in the second channel 212.

Referring to FIG. 8, the second channel 212 has an interior cross section having a base 226, a pair of sidewalls 228 and 230, and a pair of clamping surfaces 232 and 234. Within the second channel 212 is disposed a tie down/positioning member 136 again similar to that disclosed in Applicant's U.S. Pat. No. 4,460,116, issued Jul. 17, 1984. The tie down/positioning member 136 is again comprised on an upper section 140 having a vertically disposable abutment surface 142 and an aperture 144 therein, a base portion 146 including spring biasing members 148, and a pivot 150 for pivotably associating the upper section 140 with the base portion 146. The upper section 140 also includes a lower cam member on the opposite side of the pivot 150 which engages the base 226 of the first channel 212 with pivotal movement of the upper section 140 from the horizontal to the vertical and which clamps the biasing members 148 against the clamping surfaces 232 and 234 and locks the tie down/positioning member 136 in any selected position along the length of the first channel 212. The ends of the channel 212 also include an abutment 252 (FIG. 7) to aid in disposing the upper section 140 from the horizontal to the vertical.

Referring now to FIGS. 14–19 a plurality of alternative preferred embodiments of the slat assembly of the present invention are shown. Each one of the embodiments of FIGS. 14–19 provide a significant added benefit in that they serve to securely engage the hook 184 (FIGS. 9 and 10), to even more securely hold the locking mechanism 166 (FIGS. 9 and 10) thereto.

Referring specifically to FIG. 14, a slat assembly 200 is shown in accordance with a first preferred alternative embodiment of the present invention. The slat assembly 200 is identical to the slat assemblies 26 and 28 (FIGS. 1 and 2), and is secured to the roof 22 of the vehicle 24 shown in FIG. 1. Accordingly, components of the slat assembly 200 identical to slats 26 and 28 will be denoted by reference numerals increased by 200.

With continuing reference to FIG. 14, the slat assembly 200 includes first and second exterior surfaces 230 and 232, respectively, having an elongated channel 234 formed between the surfaces 230 and 232. The channel member 238 resides within the channel 234 and includes a pair of upper article supporting surfaces 240 and 242 formed by a pair of inwardly directed upper flanges 244 and 246. The channel member 238 further includes a pair of side walls 248 and 250 extending downwardly from the upper flanges 244 and 246, wall portions 252 and 253 and a base 251 formed integrally with the wall portions 252 and 253.

The primary difference between the channel member 238 of the slat assembly 200 of FIG. 14, versus the channel member 38 of FIG. 1, is the addition of a lip portion 238*a* which is integrally formed with the channel member 238, and which depends downwardly from the upper flange 246. The lip portion 238*a* includes a plurality of generally rectangularly shaped apertures 238*b*. The apertures 238*b* are each adapted to receive the leading edge 192 of the hook 184 to even more positively secure the locking mechanism 166 securely to the slat assembly 200.

With regard to FIG. 15, a slat assembly 300 in accordance with another preferred embodiment of the present invention is shown. The slat assembly 300 is identical to the slat assembly 200 of FIG. 14, and therefore components thereof have been denoted with reference numerals increased by 100 over those used in connection with FIG. 14. The difference between the slat assembly 300 is the inclusion of generally rectangularly shaped notches 338*b* in the lip portion 338*a* of the channel member 338. The construction of the slat assembly 300 is otherwise identical to the slat assembly 200 of FIG. 14. The generally rectangularly shaped notched portions 338*b* allow the leading edge 192 of the hook 184 to be more positively coupled to the slat assembly 300 with slightly less precision in the positioning of the hook 184 elevationally relative to the base 351 of the channel member 338.

Referring to FIG. 16, yet another slat assembly 400 in accordance with another alternative preferred embodiment of the present invention is shown. The components of slat assembly 400 common to slat assembly 200 have been denoted by reference numerals increased by 200 in FIG. 16. The principal difference between the slat assembly 400 from the slat assembly 200 of FIG. 14 is the inclusion of "half moon" shaped notches 438b in the lip portion 438a of the channel member 438. The half moon shaped notches 438b further allow the leading edge 192 of the hook 184 to be easily engaged therein to even more positively hold the locking mechanism 166 to the slat assembly 400.

Referring now to FIG. 17, yet another slat assembly 500 is shown in accordance with yet another alternative preferred embodiment of the present invention. Components of the slat assembly common to the slat assembly 200 are denoted in FIG. 17 by reference numerals increased by 300 over those used in FIG. 14.

The slat assembly 500 is virtually identical to the slat assembly 200 with the exception of a plurality of half moon shaped apertures 538b formed in the lip portion 538a of the channel member 538. The half moon shaped apertures 538b allow precise engagement of the leading edge of the hook 186 to secure the locking mechanism 166 very securely to the slat assembly 500.

Referring to FIG. 18, another slat assembly 600 is shown in accordance with yet another alternative preferred embodiment of the present invention. The slat assembly 600 is substantially identical to the slat assembly 200 and components of slat assembly 600 common to slat assembly 200 have been denoted by reference numerals increased by 400 over those used in FIG. 14. The principal difference is the inclusion of a plurality of generally square shaped notches 638b in the lip portion 638a of the channel member 638. The generally square shaped notches 638b also serve to securely hold the leading edge 192 of the hook 184, and thus the locking mechanism 166, securely to the slat assembly.

With reference to FIG. 19, a slat assembly 700 is shown in accordance with yet another alternative embodiment of the present invention. The slat assembly 700 is substantially identical to the slat assembly 200 and common components have been denoted by reference numerals in FIG. 19 which are 500 over those used in FIG. 14. The principal difference of the slat assembly 700 is the inclusion of a plurality of polygonal shaped notches 738b in the lip portion 738a of the channel member 738. The polygonal shaped notches 738b further serve to permit extremely secure engagement of the leading edge 192 of the hook 184 to the channel member 738, while allowing somewhat easier engagement of the leading edge 192 therein due to the angled walls of the polygonal shaped notches 738b.

Each of the slat assemblies 200–700 of FIGS. 14–19 provide unique advantages in even further securing a hook member or like device of a locking mechanism thereto, while still permitting longitudinal adjustment of the locking mechanism, and thus a cross bar attached thereto, at a plurality of positions along the length of the slat. It will be appreciated, however, that still further variations of the notches and apertures shown in FIGS. 14–19 could be used to secure a hook member, and that the embodiments of FIGS. 14–19 are meant to illustrate some of the many possible shapes of notches and apertures that can be implemented to accomplish the objectives of the present invention.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

We claim:

1. An article carrier adapted to be secured to a motor vehicle adjacent to a generally horizontally extending vehicle body surface, comprising:

a pair of elongated support members adapted to be secured to said vehicle;

each said support member having a bottom portion adapted to be disposed in generally facing relation toward said vehicle body surface, and to rest generally flush against said vehicle body surface, an upper and outer side portion curving gradually upwardly and inwardly in diverging relation to said bottom portion, a gradually curving inner surface wall and an elongated main channel member opening along a plane which diverges from a plane extending generally perpendicularly from said bottom portion of said support member, wherein said channel member is offset from a longitudinal centerline of said support member;

at least one cross member having two end portions and disposed generally perpendicularly between said support members and extending elevationally above and generally parallel to said vehicle body surface;

locking means associated with said cross member at each of said two end portions for releasably locking said cross member in a selected position on each said support member;

said locking means having a housing with a locking member extending therefrom;

said channel member having a pair of spaced-apart upper article supporting surfaces for supporting articles thereon, at least one of said upper article supporting surfaces having a depending lip portion formed so as to extend downwardly toward said vehicle body surface and into contact with or closely adjacent a bottom wall portion of said channel member, said lip portion having a series of spaced apart openings sized to permit a portion of said locking member to be drawn generally linearly into said opening to, grip thereunto, to thereby positively lock said locking means to said support member;

actuating means disposed adjacent said gradually curving inner surface wall and having a curvature which generally matches a contour of said gradually curving inner surface wall, said actuating means being pivotally associated with said locking means at a first pivot point and with said locking member at a second pivot point for moving said locking member generally linearly towards and away from said openings in response to manual movement of said actuating member pivotally relative to said locking means such that said locking member engages one of said openings in said lip portion to releasably secure said locking means and said cross member at a desired position along said support members; and wherein said actuating means can be moved to and from an unlocked position without interference from said vehicle body surface and without engaging a portion of said housing.

2. An article carrier adapted to be secured to a motor vehicle adjacent to a generally horizontally extending vehicle body surface, comprising:

a pair of elongated support members adapted to be secured to said vehicle;

each said support member having a bottom portion adapted to be disposed in generally facing relation toward said vehicle body surface, and to rest generally flush against said vehicle body surface, an upper and outer side portion curving gradually upwardly and inwardly in diverging relation to said bottom portion, a gradually curving inner surface wall and an elongated main channel member opening along a plane which diverges from a plane extending generally perpendicularly from said bottom portion of said support member, wherein said channel member comprises an integrally formed, one-piece member which is offset from a longitudinal centerline of said support member;

at least one cross member having two end portions and being disposed generally perpendicularly between said support members and extending elevationally above and generally parallel to said vehicle body surface, said cross member having a length sufficient to span between said support members when positioned above said vehicle body surface;

a bracket member associated with said cross member at each of said two end portions of said cross member for releasably locking said cross member to said support members at a selected position along said support members;

each said bracket member having a housing with a locking hook member extending therefrom;

said channel member having a pair of spaced-apart upper article supporting surfaces for supporting articles thereon, at least one of said upper article supporting surfaces having a depending lip portion formed so as to extend downwardly toward said vehicle body surface and into contact with or closely adjacent a bottom wall portion of said channel member, said lip portion having a series of equidistantly spaced apart openings sized to permit a portion of said locking hook member to be drawn generally linearly away from said vehicle body surface into engagement with one of said openings when each of said bracket members are laterally aligned with one pair of said openings in said channel members, to thereby positively lock said bracket members to said support members;

an actuating member disposed adjacent said gradually curving inner surface wall and having a curvature which generally matches a contour of said gradually curving inner surface wall, said actuating member being pivotally associated with said bracket member at a first pivot point and with said locking member associated with said bracket member at a second pivot point for moving said locking member generally linearly towards and away from said openings in a direction generally perpendicular to said openings formed in said depending lip portion in response to manual movement of said actuating member pivotally relative to said bracket member such that said locking member is caused to engage one of said openings in said lip portion to releasably secure said bracket member and said cross member at a desired position along said one of said support members.

3. An article carrier adapted to be secured to a motor vehicle adjacent to a generally horizontally extending vehicle body surface, comprising:

a pair of elongated support members adapted to be secured to said vehicle;

each said support member having a bottom portion adapted to be disposed in generally facing relation towards said vehicle body surface and to rest generally flush against said vehicle body surface, an upper and outer side portion curving gradually upwardly and inwardly in diverging relation to said bottom portion, a gradually curving inner surface wall and an elongated main channel member opening along a plane which diverges from a plane extending generally perpendicularly from said bottom portion of said support member, wherein said channel member is offset from a longitudinal centerline of said support member;

at least one cross member having two end portions and disposed generally perpendicularly between said support members and having a length sufficient to span between said support members elevationally above said vehicle body surface when positioned generally perpendicularly to said support members and generally parallel to said vehicle body surface;

a bracket member associated with said cross member at each of said two end portions of said cross member for releasably locking said cross member at a selected position along said support members;

said channel member having a pair of spaced-apart upper article supporting surfaces for supporting articles thereon, at least one of said upper article supporting surfaces having a depending lip portion formed so as to extend downwardly toward said vehicle body surface and into contact with or closely adjacent a bottom wall portion of said channel member, said lip portion having a series of spaced apart openings;

each said bracket member including:
  a housing with a locking hook member extending therefrom, said locking member being moveable generally linearly away form said vehicle body surface and sized to grip onto one of said openings in said depending lip portion; and
  an actuating member disposed adjacent said gradually curving inner surface wall and having a curvature which generally matches a contour of said gradually curving inner surface wall, said actuating member being pivotally associated with said bracket member at a first pivot point and with said locking member associated with said bracket member at a second pivot point for moving said locking member generally linearly towards and away from said openings in said depending lip portion in response to manual movement of said actuating member pivotally relative to said bracket member such that said locking member is caused to engage one of said openings in said depending lip portion to releasably secure said bracket member and said cross member at a desired position along said one of said support members.

* * * * *